United States Patent [19]

Hopkins et al.

[11] Patent Number: 5,098,647
[45] Date of Patent: Mar. 24, 1992

[54] GUIDE TUBE INSERT ASSEMBLY FOR USE IN A NUCLEAR REACTOR

[75] Inventors: Ronald J. Hopkins; John T. Land, both of Pensacola, Fla.

[73] Assignee: Westinghouse Electric Corp., Pittsburgh, Pa.

[21] Appl. No.: 552,461

[22] Filed: Jul. 16, 1990

[51] Int. Cl.⁵ .................................. G21C 1/06
[52] U.S. Cl. ..................... 376/353; 376/449
[58] Field of Search .................. 376/353, 449

[56] References Cited

U.S. PATENT DOCUMENTS

| | | | |
|---|---|---|---|
| 3,940,311 | 2/1976 | Frisch et al. | 376/353 |
| 4,173,513 | 11/1979 | Obermeyer et al. | 376/353 |
| 4,597,935 | 7/1986 | Verdean et al. | 376/353 |

Primary Examiner—Brooks H. Hunt
Assistant Examiner—Frederick H. Voss

[57] ABSTRACT

A guide tube insert assembly for receiving and guiding a control rod assembly through mutually aligned apertures formed in an upper support plate and an upper core plate of a nuclear reactor is disclosed. The guide tube insert assembly includes a plurality of guide plates with each guide plate including a plurality of bores with respective bores of each of the guide plates being axially aligned with one another so as to form a plurality of axial passages for conducting rodlets of the control rod assembly into and out of the fuel rod assemblies of a nuclear reactor. A plurality of tie rods are provided and extend between an uppermost guide plate and a lowermost guide plate, the tie rods being concentrically surrounded by a plurality of spacer sleeves of a predetermined length, with the spacer sleeves being positioned between adjacent guide plates so as to space the guide plates a predetermined distance from one another. The guide tube insert assembly further includes nuts which threadingly engage opposing ends of the tie rods so as to generate a compressive force between the lowermost and the uppermost guide plates to maintain the guide plates in their predetermined positions with respect to one another. The tie rods thereby maintain the predetermined spacing between each of the plurality of guide plates and allow the plurality of guide plates to be simultaneously removed from within a guide tube extending between the upper core plate and the upper support plate within the upper internals of a nuclear reactor.

29 Claims, 5 Drawing Sheets

GUIDE TUBE INSERT ASSEMBLY FOR USE IN A NUCLEAR REACTOR

TECHNICAL FIELD OF THE INVENTION

This invention generally relates to improvements in the upper internals assembly of a nuclear reactor, and is specifically concerned with a control rod guide tube insert which allows for the simultaneous removal of a plurality of guide plates from within a guide tube in the upper internals of the nuclear reactor as well as providing reliable support for the guide plates within the guide tube.

BACKGROUND OF THE INVENTION

The core of a modern nuclear reactor of the type used to generate electrical power generally includes an upper internals assembly disposed over a lower core barrel. The lower core barrel houses an array of fuel rod assemblies which generate heat as a result of a controlled fission reaction that occurs in the uranium oxide pellets present in their individual fuel rods. Water is constantly circulated from the lower core barrel through the upper internals and out through outlet nozzles provided in the walls of an upper core barrel in order to transfer the heat generated by the fuel rod assemblies to heat exchangers which ultimately convert this heat into usable, nonradioactive steam.

The rate of the fission reaction taking place within the fuel rod assemblies is regulated by means of a control rod assembly. Each of these control rod assemblies is formed from an array of stainless steel tubes containing a neutron absorbing substance, such as silver, indium or cadmium. These stainless steel tubes (known as "rodlets" in the art) are suspended from a spider-like bracket. A reciprocable drive rod is connected to the spider-like bracket for either inserting or withdrawing the rodlets of the control rod assembly deeper into or farther out of each of the fuel rod assemblies in order to modulate the amount of heat generated thereby.

The upper internals assembly includes an upper core barrel arranged in tandem with the lower core barrel of the reactor. The ceiling of the upper core barrel is formed from an upper support plate. The peripheral edge of this support plate is seated around the upper edge of the upper core barrel. Both the support plate and the upper core plate which underlies it include a plurality of apertures for both conducting the stream of hot, pressurized water exiting the fuel rod assemblies to the heat exchangers, as well as for conducting a control rod assembly either into or out of each of the fuel rod assemblies. Separate guide lubes are provided between apertures in both the support and core barrel plates which are aligned with each other and with one of the fuel assemblies in the lower core barrel. Each guide tube includes a plurality of fixed guide plates which are fixedly secured to the guide tubes in a variety of known manners. The purpose of these guide tubes and guide plates was to align and guide the relatively long and flexible rodlets of the control rod assemblies into a particular fuel assembly. Additionally, separate support columns are connected between the upper support plate and the underlying upper core plate in order to suspend and support the upper core plate over the fuel rod assemblies contained Within the lower core barrel.

To facilitate the servicing of the components within the upper core barrel of such prior art nuclear reactors, the guide tubes had to be removable. Accordingly, each of the guide tubes included a pair of opposing, apertured lugs at its bottom end for receiving the top ends of a pair of opposing guide pins which were mounted on either side of one of the control rod-receiving apertures in the upper core plate. A mounting flange was provided at the upper end of each of the guide tubes. This flange sat upon the upper surface of the support plate when the guide tube was completely slid through a support plate aperture, thereby suspending the guide tube over its respective aperture in the upper core plate so that the guide pins in the upper core plate provided only lateral support for the guide tube. To minimize corrosion problems, the guide pins in such designs were formed from Inconel 750, while the support plate, upper core plate and other components of the guide tubes were formed from No. 304 stainless steel.

The Applicants have observed that a number of problems have resulted from such prior art upper internals designs. For example, the differences in the coefficient of thermal expansion between the Inconel which forms the guide tubes and the stainless steel which forms the support plate and the upper core plate have generated stresses in the guide pins that have occasionally caused these pins to break due to stress corrosion cracking. Such pin breakage has had the immediate negative consequence of introducing large pieces of metallic debris into the pressurized stream of water flowing up through the upper core plate. Such debris can, of course, damage the primary system circulation pumps. Additionally, after the loss of one or more of the guide pins, the currents generated by this rapidly flowing stream of water (which typically moves at a rate of 20 feet per second) can cause the guide tube to wobble out of alignment with its respective aperture and possibly strike and damage adjacent guide tubes. Still another problem associated with such prior art guide tubes stems from the fact that they are not designed to bear any significant tensile load. Hence, separate support columns must be provided for suspending the upper core plate over the fuel rod assemblies. The use of two separate types of columns within the upper core barrel complicates both the assembly and disassembly of this particular region of the reactor, which in turn greatly increases the time required for routine maintenance in the upper internals of the reactor.

In addition to the above, when the guide tubes are removed for servicing, the presence of the fixed guide plates makes the servicing of such tubes difficult. Further, the replacement of one or several of the guide plates is burdensome because each is individually fixed within the guide tube. Moreover, because each of the guide plates are individually connected to the guide tube, the connection between the guide plates and the thin guide tube will be subjected to various stresses due to vibrations in the system, differences in materials as well as the continued flow of water about the plates.

Consequently, there is clearly a need for a guide plate assembly which will not be subjected to a majority of the above-mentioned stress generating phenomenons while being readily removable from within the guide tubes of the upper internals assembly of the nuclear reactor.

SUMMARY OF THE INVENTION

It is a primary object of the present invention to overcome the above-mentioned shortcomings associated with conventional guide tubes and guide plates.

Another object of the present invention is to provide a removable guide tube insert assembly such that a plurality of guide plates positioned within a guide tube in the upper internals of the nuclear reactor may be readily removed thereby reducing the downtime of the nuclear reactor.

Yet another object of the present invention is to provide a guide tube insert assembly which is fixed with respect to the guide tube such that the vibrations associated with the operations of a nuclear reactor will not adversely affect the integrity and positioning of each of the respective interconnected guide plates.

Yet another object of the present invention is provide a guide tube insert assembly which is readily removable from within the guide tube any which includes a plurality of guide plates Which reliably conducts the rodlets of a control rod assembly into and out of each of the fuel rod assemblies of a nuclear reactor in order to accurately modulate the amount of heat generated within the fuel rod assemblies.

These, as well as additional objects of the present invention, are achieved by providing a guide tube insert assembly for receiving and guiding a control rod assembly through mutually aligned apertures formed in an upper support plate and an upper core plate of a nuclear reactor. The guide tube insert assembly includes a plurality of guide plates with each guide plate including a plurality of bores with respective bores of each of the guide plates being axially aligned with one another so as to form a plurality of axial passages for conducting rodlets of the control rod assembly into and out of the fuel rod assemblies of a nuclear reactor. A plurality of tie rods are provided and extend between an uppermost guide plate and a lowermost guide plate, the tie rods being concentrically surrounded by a plurality of spacer sleeves of a predetermined length, with the spacer sleeves being positioned between adjacent guide plates so as to space the guide plates a predetermined distance from one another. The guide tube insert assembly further include nuts which threadingly engage opposing ends of the tie rods so as to generate a compressive force between the lowermost and the uppermost guide plates to maintain the guide plates in their predetermined positions with respect to one another. The tie rods thereby maintain the predetermined spacing between each of the plurality of guide plates and allow the plurality of guide plates to be simultaneously removed from within a guide tube extending between the upper core plate and the upper support plate within the upper internals of a nuclear reactor.

The guide tube insert assembly of the present invention is secured within the guide tube of a nuclear reactor at both the uppermost and lowermost guide plates. The uppermost guide plate is of a larger diameter than the remaining guide plates such that the periphery of the uppermost guide plate rests on an upper surface of the upper support plate and is secured thereto by a plurality of equidistantly spaced bolts. The lowermost guide plate includes a plurality of circumferentially spaced axially extending alignment pin slots such that when the guide tube insert assembly is fully inserted into the guide tube the alignment pin slots align with a corresponding number of alignment pins extending from an inner surface of the guide tube adjacent the upper core plate. The engagement between the alignment slots and the alignment pins maintains the lower portion of the guide tube assembly both rotationally and transversely stable with respect to the guide tube when the guide tube insert assembly is fully inserted within the guide tube.

These, as well as additional advantages of the present invention, will become apparent from the following detailed description of the preferred embodiment and the several figures.

DETAILED DESCRIPTION OF THE PREFERRED EMBODIMENT

Figure 1:
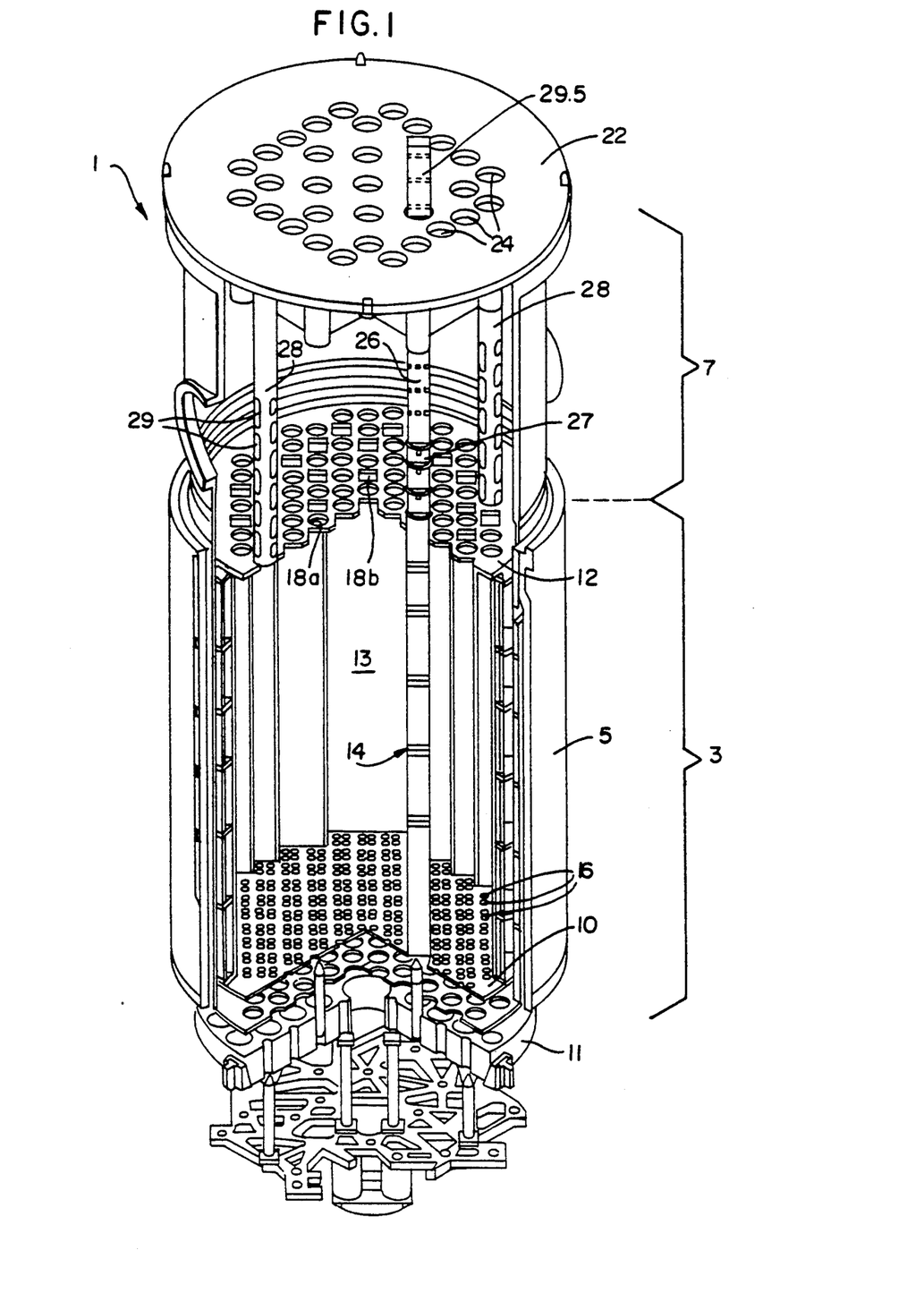
FIG. 1 is a perspective, cut-away view of the type of reactor core to which the guide tube and guide tube insert assembly of the present invention may be readily adapted.

With reference now to FIG. 1, the guide tube insert assembly of the present invention finds particular use in a reactor core 1 of the type having a lower core barrel 3 circumscribed by a thermal shield 5, and an upper core barrel 7. In such reactor cores 1, the lower core barrel 3 includes a floor and a ceiling, the floor being formed from a lower core plate 10 that is supported by a core support forging 11, and the ceiling being formed from an upper core plate 12. Baffle plates 13 circumscribe the interior sides of the lower core barrel 3. The general purpose of these baffle plates 13 is to divert a portion of the flow of incoming primary water (not shown) upwardly to cool the lower core barrel. The remainder of the flow moves upwardly through the upper core plate 12, and from thence to the upper core barrel 7. A plurality of fuel rod assemblies 14 (only one of which is shown) are disposed within the lower core barrel 3 between the lower core plate 10 and the upper core plate 12. In operation, the uranium fuel contained within the fuel rods forming these fuel rod assemblies 14 radiates a considerable amount of heat which is absorbed by the water flowing upwardly through the lower core plate 11 and transferred to a steam generator (not shown) that. converts this heat into nonradioactive steam.

To uniformly distribute the water flowing upwardly through the core support forging 11 and on into the upper core barrel 7, both the lower core plate 10 and the upper core plate 12 have a uniform array of flow apertures 16 and 18a, 18b, respectively, which are in mutual alignment with one another. The bottom and top ends of each of the fuel rod, assemblies 14 are positioned over and under one of the flow apertures 18b and 16, respectively, to heat the flow of water through these apertures.

The core barrel 7 has a floor and a ceiling defined by the upper core plate 12 and an upper support plate 22, respectively. Like the core plates 10 and 12, the upper support plate 22 includes flow apertures 24. Each of the these flow apertures 24 is disposed in alignment with one of the flow apertures 18b of the upper core plate 12. Disposed between each pair of mutually aligned apertures 22 and 18b is a tubular control rod guide tube 26. The purpose of this guide tube 26 is to align and guide a control rod assembly 27 into and out of one of the fuel assemblies 14. The neutron-absorbing materials forming the rodlets of the control rod assembly 27 are capable of slowing down the chain reaction of fission taking place Within the uranium fuel of the fuel assemblies 14. Hence the output of the heat generated by the fuel rod assemblies 14 is dependent upon the extent to which the control rod assemblies 27 are extended therein.

As will be better understood hereinafter, the upper core plate 12 is not suspended over the fuel rod assembly 14 by means of the control rod guide tubes 26; this function is instead performed by support columns 28 (only one of which is shown). Like the previously described guide tube 26, each of the support columns 28 is generally tubular in shape albeit with thicker walls. The lower, open end of each of these tubular support columns 28 is aligned with one of the flow apertures 18a of the upper core plate 12, while the upper open end of each of these members 28 is secured against a closed portion of the upper support plate 22. To facilitate the flow of water from the flow apertures 18a, 18b of the upper core plate 12 up to the upper core barrel 7, a plurality of flow slots 29 is cut in the walls of the column 28 as shown. The upper core plate 12, the support plate 22, the control rod guide tubes 26 and the support columns 28 are each made from No. 304 stainless steel.

Figure 2:
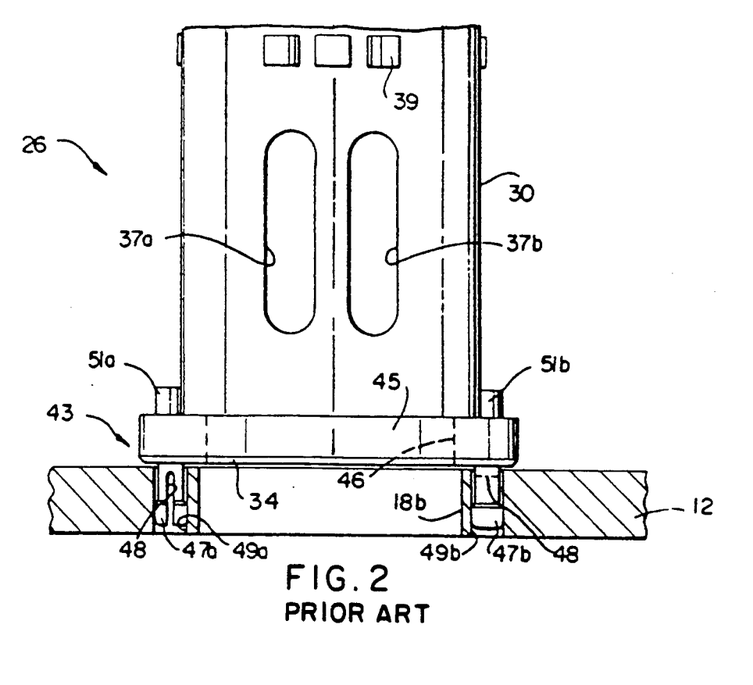
FIG. 2 is a cross-sectional side view of the bottom end of a prior art guide tube incorporating fixed guide plates.
Figure 3:
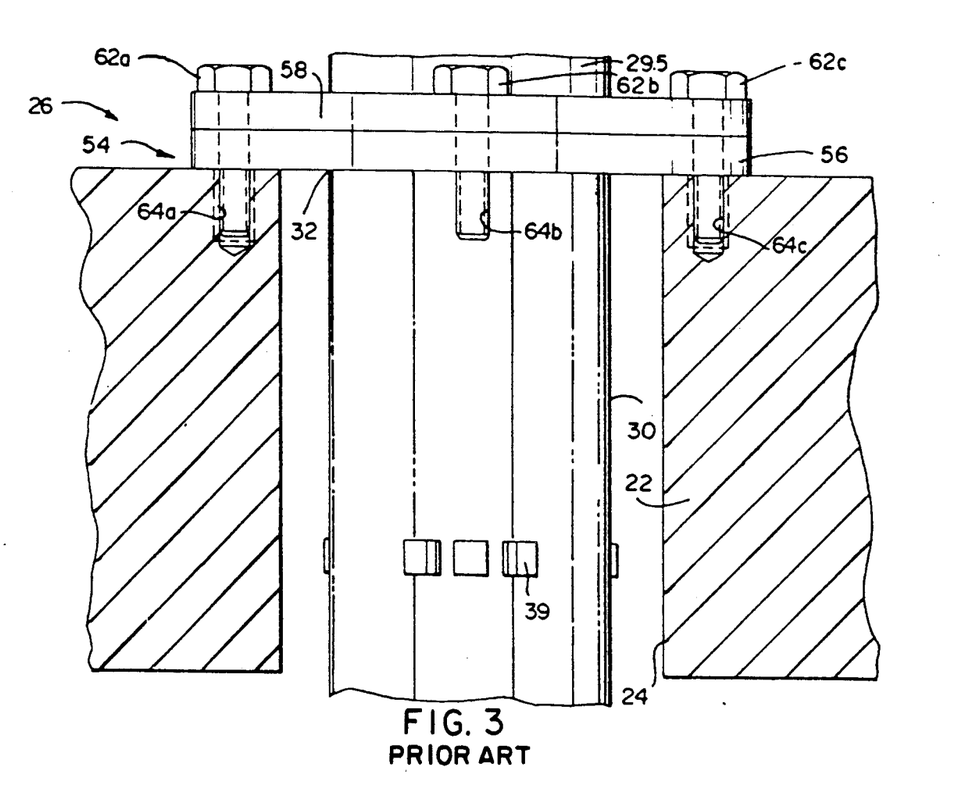
FIG. 3 is a cross-sectional side view of the top end of a prior art guide tube incorporating fixed guide plates.

With reference now to FIGS. 2 and 3, a prior art control rod guide tube 26 is generally formed from a tubular member 30 having a top end 32, and a bottom end 34. The walls of the tubular member 30 are approximately 0.25 inches thick. With specific reference now to FIG. 2, the bottom end of the tubular member 30 includes a pair of flow ports 37a and 37b for directing the pressurized water that flows up through the interior of the tubular member 30 by way of upper core plate aperture 18b. Disposed just above these flow ports 37a, 37b are a series of guide plates 39 which are uniformly spaced along the longitudinal axis of the guide tube 26 and secured in place within the guide tube wall. Each of the guide plates 39 includes a plurality of rodlet openings for receiving and guiding the individual neutron-absorbing rodlets of a control rod assembly 27. The circular open end of the tubular member 30 is maintained in alignment with the flow aperture 18b of the upper core plate 12 by means of a lower mounting assembly 43. This assembly 43 includes circular flange 45 which extends out around the bottom end of the tubular member 30. The inner perimeter of the circular flange 45 defines a water conducting opening 46 for receiving the stream of pressurized water traveling through the flow aperture 18b of the upper core plate 12. The outer edge of the 47a and 47b. These pin members 47a, 47b each include a centrally disposed slot 48 which affords some resiliency to the tapered ends of these pins. The pin members 47a and 47b are each resiliently engaged within a pair of bores 49a and 49b which are positioned on opposite sides of the flow aperture 18b. The pin members 47a and 47b provide lateral support for the guide tube 26 which keep it from moving or vibrating 15 from side to side as pressurized water enters its open bottom end and flows out of the flow ports 37a and 37b. These pin members 47a and 47b are secured onto the flange 45 by means of lock nut assemblies 51a and 51b. In the prior art, both the pin members 47a and 47b and the lock nut assembly 51a and 51b are formed from Inconel 750.

With specific reference to FIG. 3, the top open end of the tubular member 30 of the guide tube 26 is secured around the top edge of one of the flow apertures 24 of the upper support plate 22 by means of an upper mounting assembly 54. Like the previously discussed lower mounting assembly 43, the upper mounting assembly 54 includes a flange 56 which circumscribes the upper edge of the tubular member 30 of the guide tube 26. This flange 56 is in turn connected to both the bottom flange 58 of an upper guide tube 29.5 by means of bolts 62a-62d which screw into threaded bores 64a-64d that extend through flange 58, flange 56, and on into the upper support plate 22. The prior art upper mounting assembly 54 in effect suspends the guide tube 26 into position over the upper core plate 12. No significant tensile load is placed upon the tubular member 30 of such prior art guide tubes 26; all of the tensile load necessary to support the upper core plate 12 over the fuel rod assemblies 14 is borne by the previously discussed support columns 28.

Figure 4A:
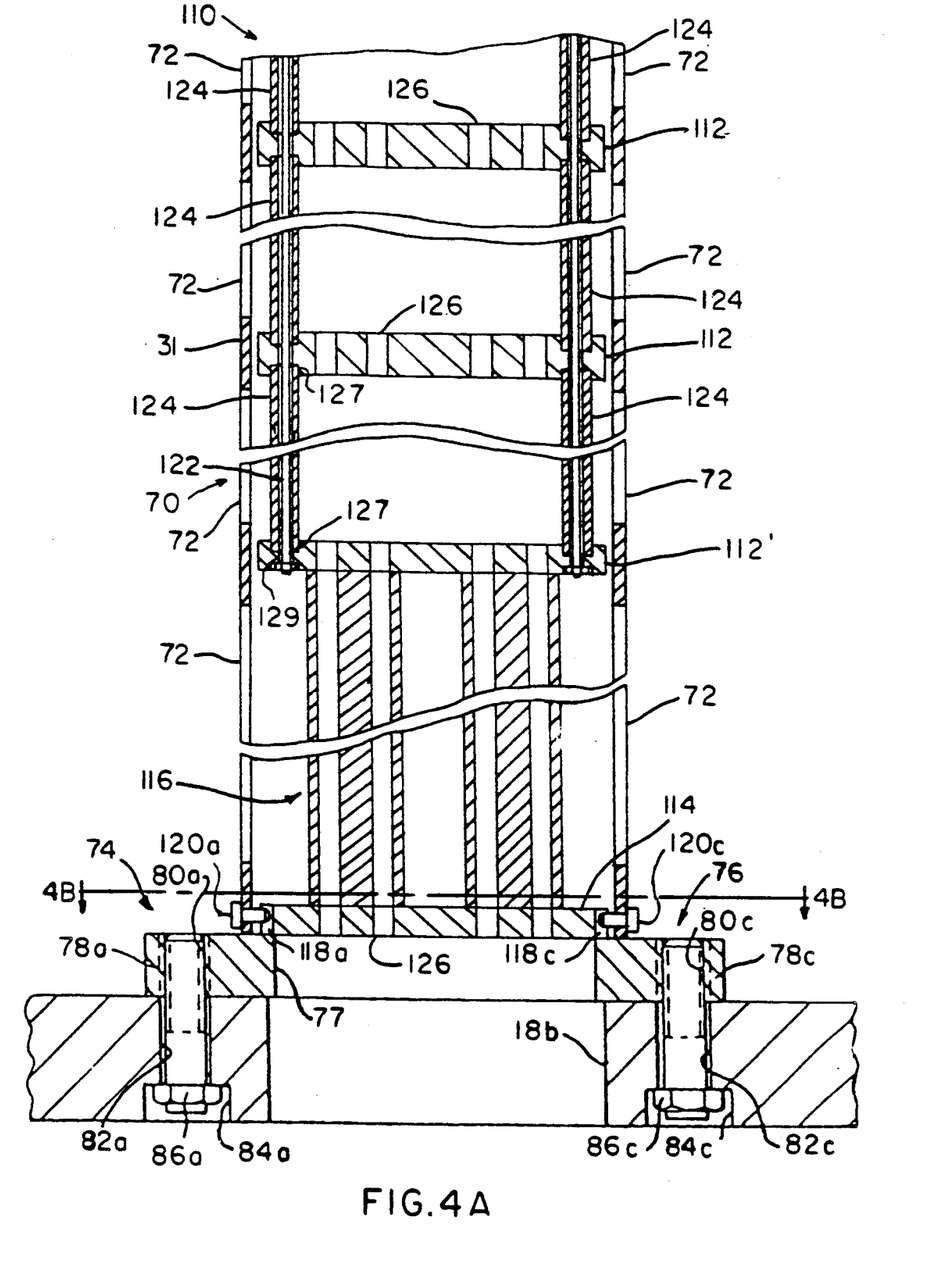
FIG. 4A is a cross-sectional side view of the bottom end of a combination guide tube and support column embodying the guide tube insert assembly in accordance with the present invention, illustrating how the guide tube insert assembly secures to the guide tube and how the guide tube secures to the upper core plate of the reactor.
Figure 4B:
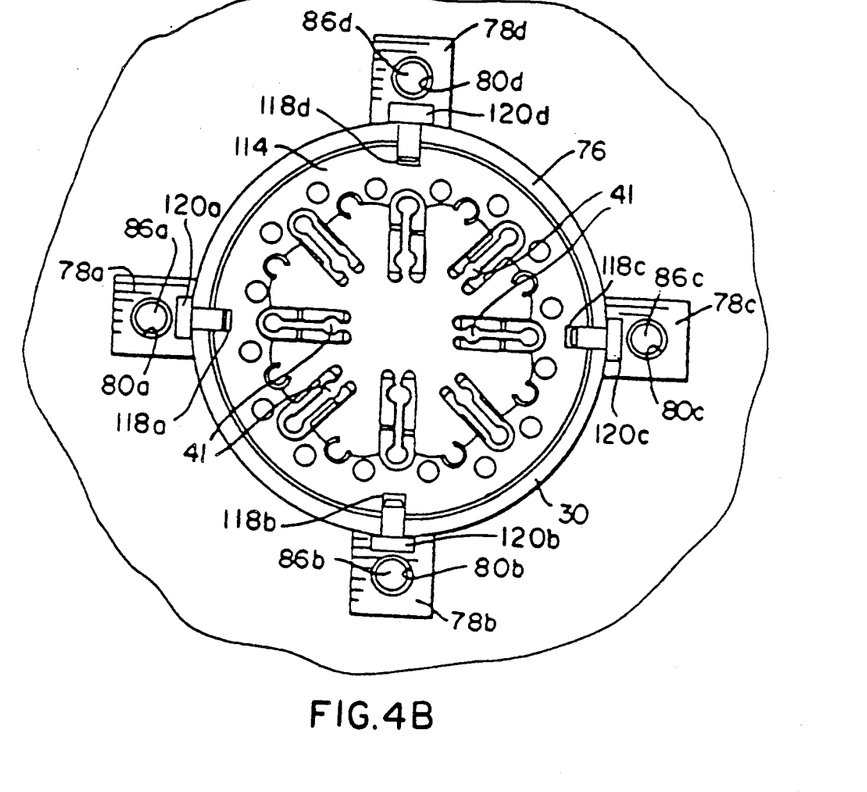
FIG. 4B is a cross-sectional view of the guide tube insert assembly positioned within the combined guide tube and support column illustrated in FIG. 4A taken along the line 4B—4B.

With reference now to FIGS. 4A and 4B, the combination guide tube and support column 70 to which the present invention may be readily adapted is illustrated. The combination guide tube and support column 70 includes a tubular member 31 and a series of uniformly spaced interconnected guide plates 112. The flow ports 72 may be of a variety of configurations so as to compensate for asymmetries in the flow resistance exerted by the control rod assembly which the tubular member 31 contains. Additionally, the flow area of the ports 72 is dimensioned to insure that these ports will not jet their respective water flows cut quickly so as to create lateral currents in the upper core barrel which could cause vibration and fretting of the control rod assemblies 27 contained within the tubular member 31.

The bottom end of the combination guide tube and support column 70 which receives the guide tube insert assembly 110 of the present invention includes a lower mounting assembly 74 formed, from a flange 76 which circumscribes the bottom edge of the tubular member 30 and the periphery of opening 77, and four lugs 78a-78d which are equidistantly spaced 90 degrees around the flange 76. The lugs 78a-78d include threaded bores 80 which are mutually alignable with a set of four, orthogonally disposed threaded bores 82a-82d located around the edge of the flow aperture 18b in the upper core plate 12. At its bottom end, each of the bores 82a-82d in the plate 12 terminates in a countersunk portion 84a-84d respectively. The lower mounting assembly 74 is held together by means of bolts 86a-86d having shanks which are threaded through the bores 80a-80d and 82a-82d, and bolt heads which are received within the countersunk portions 84aa-84d as shown. Unlike the pin members 47a and 47b used in the mounting assembly 43 of a conventional guide tube, the bolts 86a-86d are formed from strain hardened No. 316 stainless steel which is quite similar to the No. 304 stainless steel forming the upper core plate 12 and the tubular 30 of the combination guide tube and support column 70 so as to avoid thermal stresses and failure due to stress corrosion cracking. These features being set forth in greater detail in copending U.S. application Ser. No. 07/257,672 filed Oct. 14, 1988, the subject matter of which is incorporated herein by reference.

The guide tube insert assembly 110 is particularly illustrated in FIG. 4A. This insert assembly is composed of a plurality of guide plates 112 which are interconnected with one another so as to form the unitary guide tube insert assembly 110. A lowermost guide plate 114 is provided at the bottom of a continuous guide plate section 116. The guide plate 114 includes four circumferentially spaced alignment pin slots 118a–118d such that when the guide tube insert assembly 110 is fully inserted into the guide tube 31, the alignment pin slots 118a–118d will align with a corresponding number of alignment pins 120a–120d. These alignment pins extend through the wall of the guide tube 31 adjacent the upper core plate and maintain the lower portion of the guide tube assembly 110, both rotationally and transversely stable with respect to the guide tube 31.

The lowermost guide plate 114 is connected to the second lowermost guide plate 112' by way of the continuous guide plate section 116 which may be welded to each of the guide plates 114 and 112' in a conventional manner. The remaining plurality of guide plates 112 are fixedly secured with respect to the second lowermost guide plate 112' by way of a plurality of tie rods 122. In the preferred embodiment, four such tie rods 122 are provided and are equidistantly spaced 90 degrees about the periphery of the guide plate 112' and the remaining guide plates 112. The tie rods preferably being ¼ inch in diameter. The tie rods are concentrically surrounded by a plurality of guide plates 112 axially spaced a predetermined distance from one another. The particular spacing between guide plates will depend on the specific application; however, in the preferred embodiment, there would be ten plates spaced approximately 5.5 inches apart. It should be noted that because the guide plates are separate from the guide tube 31, a greater number of guide plates which are thicker than conventional guide plates may be positioned within the guide tube 31 thereby resulting in a reduced axially spacing between the plurality of guide plates which in turn reduces rod vibration and increases the wear life of both the rodlets and the guide tube with respect to conventional designs without sacrificing the structural integrity of the guide tube. In the preferred embodiment, guide plates 112' and 114 are approximately 1.5 inches thick and secured to one another by the continuous section 116 and the guide plates 112 are preferably approximately 2 inches in thickness.

As with conventional guide plates, each of the plurality of guide plates 112, 112' and 114 include a plurality of axially extending and mutually aligned bores 126 which reliably guide the control rod assemblies (not shown). In addition to the bores 126, both the upper and lower surfaces of the guide plates include countersinks 127 which surround tie rod bores 129 for receiving the ends of the sleeves 124. This maintains the sleeves in a stable condition with respect to the tie rods 122 and the guide plates 112, 112' and 114. The sleeves 124 may further be welded in place within the countersinks 127.

Figure 5:
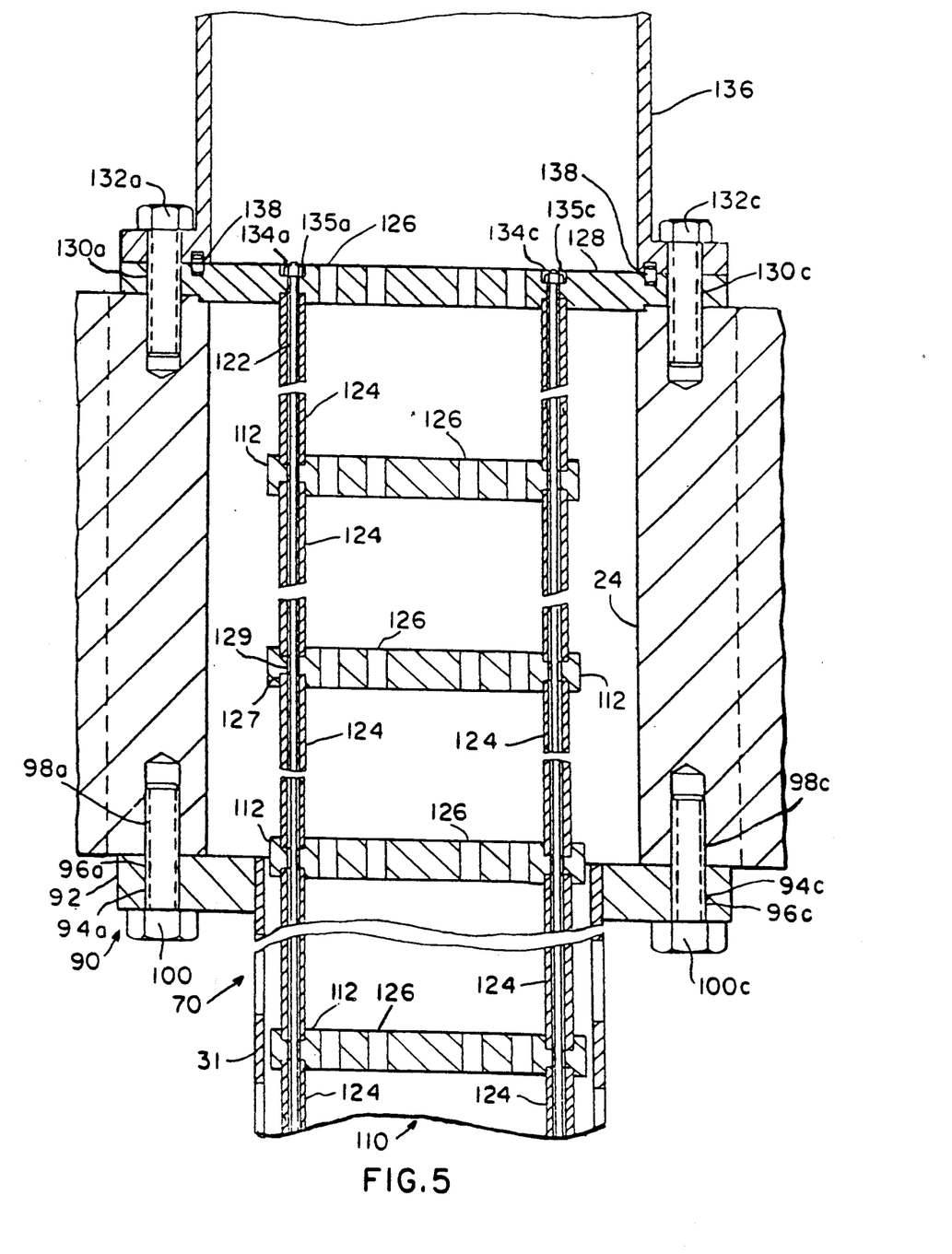
FIG. 5 is a cross-sectional side view of the upper end of the combined guide tube and support column embodying the guide tube insert assembly in accordance with of the present invention.

With reference now to FIG. 5, the combination guide tube and support column 70 embodying the guide tube insert assembly 110 of the present invention further includes an upper mounting assembly 90. This assembly 90 is formed from a flange 92 which circumscribes the outer wall of the tubular member 31 at an axial location just below the bottom surface of the upper support plate 22. The flange 92 is firmly secured to the wall of the tubular member 31 by peripheral welds (not shown). The flange 92 includes four lugs 94a–94d (94a and 94c being illustrated) equidistantly spaced 90 degrees around its periphery. Each of the lugs 94a–94d includes a threaded bore 96a–96d which is registrable with a threaded bore 98a–98d (94a and 98c being illustrated) located on the underside of the plate 22 along the bottom end of the flow aperture 24. Again, strain hardened No. 316 stainless steel bolts 100a–100d (100a and 100c being illustrated) extend through the threaded bores 96a–96d and 98a–98d in order to secure the mounting assembly 90 together.

As can be seen in FIG. 5, the guide tube insert assembly 110 extends upwardly through the upper support plate 22 and terminates in the form of a top guide plate 128. The top guide plate 128 is of a larger diameter than the guide plates 112 and rests on the upper surface of the upper support plate 22. Equidistantly spaced about the periphery of the top guide plate 128 are threaded bores 130a–130d (130a and 130c being illustrated) for receiving the threaded bolts 132a–132d, respectively (132a and 132c being illustrated)

The tie rods 122 terminate at the top guide plate 128 with the securing nuts 134a–134d (134a and 134c being illustrated) being received within countersinks 135a–135d (135a and 135c being illustrated) in an upper surface of the top guide plate 128. Again, each of the plurality of guide plates 112, as well as the top guide plate 128 are mutually spaced from one another by way of the tubular sleeves 124 such that the plurality of guide plates are maintained both axially as well as radially fixed with respect to one another.

Attached to the top guide plate 128 is an extended upper guide tube assembly 136 which in itself may include a plurality of guide plates interconnected in the manner previously discussed. The upper guide tube assembly 136 is readily aligned with the top guide plate 128 by way of pins 138 which will ensure that the plurality of bores formed in the guide plates within the upper guide tube assembly will be in proper alignment with the plurality of bores 126 formed in the guide plates positioned between the upper support plate 22 and the upper core plate 12.

By providing the above described readily removable guide tube insert assembly, the aforementioned stresses which damage the guide plates, pins and guide tubes of conventional assemblies will be minimized, thus resulting in a significant reduction in the routine maintenance required in repairing the guide tubes and plurality of guide plates. Further, when it is necessary to repair one or several of the guide plates within the guide tube, the plurality of guide plates may be simultaneously and readily removed from within the guide tubes. This results in a significant reduction in the exposure of maintenance personnel to contaminated structures while also reducing the overall cost of routine service procedures and downtime of the system. Additionally, the guide tube insert assembly in accordance with the present invention is readily adaptable to the removable combination support and guide tube members previously discussed and set forth in copending U.S. application Ser. No. 07/257,672 filed Oct. 14, 1988. This combination significantly reduces the effects of stresses acting on the guide tube and guide plates thereby resulting in a further reduction in the exposure of maintenance personnel to contaminated structures and overall maintenance costs.

While the present invention has been described with reference to a preferred embodiment, it will be appreciated by those skilled in the art that the invention may be practiced otherwise than as the spirit and scope of the invention. It is, therefore, to be understood that the spirit and scope of the invention be limited only by the appended claims.

We claim:

1. In an internals assembly for a nuclear reactor of the type including an upper support plate and an upper core plate, each having a plurality of apertures for conducting control rod assemblies into and out of fuel assemblies with the apertures of the upper support plate being aligned with the apertures of the upper core plate, a guide tube insert assembly comprising:

an elongated tubular body extending between at least one of the aligned apertures formed in the upper support plate and the upper core plate;

a plurality of guide plates within said elongated tubular body, each of said guide plates having a planar surface extending substantially perpendicular to an axial direction of said tubular body;

at least one interconnecting means for interconnecting said plurality of guide plates into a guide tube insert assembly such that said plurality of guide plates are simultaneously mountable within and removable from said elongated body, and the periphery of each of said guide plates is spaced apart from the inner walls of the elongated tubular body at every point when said insert assembly is mounted within said tubular body, and a stabilizing means for securing the lowermost guide plate of said guide tube insert assembly within said elongated tubular body to prevent rotational and lateral movement between said guide tube insert assembly and said tubular body.

2. The assembly as defined in claim 1, wherein said interconnecting means detachably and individually connects each of said guide plates to said guide tube insert assembly.

3. The assembly as defined in claim 2, further comprising at least one tie rod bore formed in each of said guide plates with each of said tie rod bores being axially aligned with one another, wherein said interconnecting means includes a tie rod which extends through each of said respective tie rod bores.

4. The assembly as defined in claim 3, wherein said interconnecting means further includes a plurality of spacer sleeves concentrically positioned about said tie rods, each of said spacer sleeves having a first and second end with one of said ends contacting an upper surface of a respective guide plate and the other of said ends contacting a lower surface of an adjacent guide plate.

5. The assembly as defined in claim 4, wherein said spacer sleeves are of a predetermined length so as to space said guide plates a predetermined distance from one another.

6. The assembly as defined in claim 5, further comprising a countersink portion in formed about said tie rod bores in both the upper and lower surfaces of said guide plates, wherein said first and second ends of a respective spacer sleeve is received within said respective countersink.

7. The assembly as defined in claim 6, further comprising a securing means attached to each end of said tie rod for securing said guide plates in a predetermined position with respect to one another.

8. The assembly as defined in claim 7, wherein said securing means is a nut which threadingly engages a threaded end portion of said tie rod, said nut being received within said countersink formed in the upper surface of an upper most guide plate and said countersink formed in the lower surface of a lower most guide plate so as to generate an axial compressive force to maintain said plurality of guide plates in said position.

9. The assembly as defined in claim 4, wherein each of said guide plates includes four tie rod bores equidistantly spaced adjacent a periphery of said guide plates and four tie rods extending between the lowermost guide plate and the uppermost guide plate.

10. The assembly as defined in claim 1, wherein said stabilizing means includes at least one axially extending groove formed in a periphery of a lowermost guide plate and at least one corresponding alignment pin extending through said elongated tubular body adjacent the upper core plate, said alignment pin being received within said groove when said plurality of interconnected guide plates are fully inserted into said elongated tubular member.

11. The assembly as defined in claim 10, wherein there are four alignment pins equidistantly spaced about said elongated tubular member and said lowermost guide plate includes four axially extending grooves equidistantly spaced about the periphery of said lowermost guide plate, each of said grooves corresponding to a respective one of said four alignment pins.

12. A guide tube insert assembly for receiving and guiding a control rod assembly through mutually aligned apertures formed in an upper support plate and an upper core plate of a nuclear reactor, said guide tube insert assembly comprising:

an elongated tubular body extending between at least one of the aligned apertures formed in the upper support plate and the upper core plate;

a plurality of guide plates within said elongated tubular body, each of said guide plates having a planar surface extending substantially perpendicular to an axial direction of said tubular body; and at least one interconnecting means for interconnecting said plurality of guide plates into a guide tube insert assembly such that said plurality of guide plates are simultaneously removable from within said elongated body, wherein said interconnecting means detachably and individually connects each of said guide plates to said insert assembly.

13. The assembly as defined in claim 12, wherein the periphery of each of said guide plates are spaced apart at all points from the inner walls of said tubular body when said insert assembly is mounted within said tubular body, and further comprising a stabilizing means for securing said guide tube insert assembly within said elongated tubular body including a recess and an alignment pin receivable in said recess, said recess and pin being disposed between said lowermost guide plate of said assembly and a lower portion of said tubular body.

14. The assembly as defined in claim 12, further comprising at least one tie rod bore formed in each of said guide plates with each of said tie rod bores being axially aligned with one another, wherein said interconnecting means includes a tie rod which extends through each of said respective tie rod bores.

15. The assembly as defined in claim 14, wherein said interconnecting means further includes a plurality of spacer sleeves concentrically positioned about said tie rods, each of said spacer sleeves having a first and second end with one of said ends contacting an upper surface of a respective guide plate and the other of said ends contacting a lower surface of an adjacent guide plate.

16. The assembly as defined in claim 15, wherein said spacer sleeves are of a predetermined length so as to space said guide plates a predetermined distance from one another.

17. The assembly as defined in claim 16, further comprising a countersink portion in formed about said tie rod bores in both the upper and lower surfaces of said guide plates, wherein said first and second ends of a respective spacer sleeve is received within said respective countersink.

18. The assembly as defined in claim 17, further comprising a securing means attached to each end of said tie rod for securing said guide plates in a predetermined position with respect to one another.

19. The assembly as defined in claim 18, wherein said securing means is a nut which threadingly engages a threaded end portion of said tie rod, said nut being received within said countersink formed in the upper surface of an upper most guide plate and said countersink formed in the lower surface of a lower most guide plate so as to generate an axial compressive force to maintain said plurality of guide plates in said predetermined position.

20. The assembly as defined in claim 15, wherein each of said guide plates includes four tie rod bores equidistantly spaced adjacent a periphery of said guide plates and four tie rods extending between the lowermost guide plate and the uppermost guide plate.

21. The assembly as defined in claim 12, wherein said stabilizing means includes at least one axially extending groove formed in the periphery of said lowermost guide plate and at least one corresponding alignment pin extending through said elongated tubular body adjacent the upper core plate, said alignment pin being received within said groove when said assembly of interconnected guide plates is fully inserted into said elongated tubular member.

22. The assembly as defined in claim 21, wherein there are four alignment pins equidistantly spaced about said elongated tubular member and said lowermost guide plate includes four axially extending grooves equidistantly spaced about the periphery of said lowermost guide plate, each of said grooves corresponding to a respective one of said four alignment pins.

23. A guide tube insert assembly for receiving and guiding a control rod assembly through mutually aligned apertures formed in an upper support plate and an upper core plate of a nuclear reactor, said guide tube insert assembly comprising:

a plurality of guide plates each having at least one bore extending therethrough for receiving a rodlet of said control rod assembly, and at least one tie rod bore formed in each of said guide plates with each of said tie rod bores being axially aligned with one another, at least one interconnecting means for interconnecting said plurality of guide plates including a tie rod which extends through each of said respective tie rod bores, and a plurality of spacer sleeves concentrically positioned about said tie rods, each of said spacer sleeves having a first and second end with one of said ends contacting an upper surface of a respective guide plate and the other of said ends contacting a lower surface of an adjacent guide plate;

wherein said interconnecting means maintains a predetermined spacing between each of said plurality of guide plates and maintains respective bores of each of said guide pates mutually aligned with one another.

24. The assembly as defined in claim 23, wherein each of said guide plates includes a plurality of bores with respective bores of each of said guide plates being axially aligned with one another so as to form a plurality of axially extending passages.

25. The assembly as defined in claim 23, wherein said spacer sleeves are of a predetermined length so as to space said guide plates a predetermined distance from one another.

26. The assembly as defined in claim 25, further comprising a countersink portion in formed about said tie rod bores in both the upper and lower surfaces of said guide plates, wherein said first and second ends of a respective spacer sleeve is received within said respective countersink.

27. The assembly as defined in claim 26, further comprising a securing means attached to each end of said tie rod for securing said guide plates in a predetermined position with respect to on another.

28. The assembly as defined in claim 27, wherein said securing means is a nut which threadingly engages a threaded end portion of said tie rod, said nut being received within said countersink formed in the upper surface of an upper most guide plate and said countersink formed in the lower surface of a lower most guide plate so as to generate an axial compressive force to maintain said plurality of guide plates in said predetermined position.

29. The assembly as defined in claim 25, wherein each of said guide plates includes four tie rod bores equidistantly spaced adjacent a periphery of said guide plates and four tie rods extending between the lowermost guide plate and the uppermost guide plate.

* * * * *